United States Patent [19]

Grobman et al.

[11] 3,833,797
[45] Sept. 3, 1974

[54] STATISTICAL NOISE PROCESSOR

[75] Inventors: Leon Grobman, Philadelphia; Benson Polin, Warminster; Donald Savage, Danboro, all of Pa.

[73] Assignee: The United States of America as represented by the Secretary of the Navy, Washington, D.C.

[22] Filed: Nov. 14, 1973

[21] Appl. No.: 415,910

[52] U.S. Cl............. 235/151.3, 235/152, 324/77 B, 328/167
[51] Int. Cl............................................ G06f 15/20
[58] Field of Search........ 235/151.3, 152; 324/77 B; 328/167

[56] References Cited
UNITED STATES PATENTS

| | | | |
|---|---|---|---|
| 2,694,142 | 11/1954 | Laidig | 328/167 |
| 3,124,745 | 3/1964 | Schroeder | 324/77 |
| 3,350,643 | 10/1967 | Webb | 324/77 B |
| 3,557,354 | 1/1971 | Trimble | 235/152 |
| 3,605,029 | 9/1971 | Freedman | 328/167 |
| 3,725,690 | 4/1973 | Hjorth | 235/151.3 |

Primary Examiner—Joseph F. Ruggiero
Assistant Examiner—Errol A. Krass
Attorney, Agent, or Firm—R. S. Sciascia; Henry Hansen

[57] ABSTRACT

A statistical processing device for improving the signal to noise ratio of signals and transients within a noise environment. Samples of electrical signals indicative of ocean noise are applied to a calculator that obtains the mean, variance and third moment of the electrical signal. A delay circuit delays the calculator output signal for comparison with later produced electrical signal samples. A second calculator receives the outputs from the delay circuit and manipulates the difference between a first higher order moment signal to obtain an output signal having an amplitude indicative of a transient or target. The output signal is displayed on a lofargram which provides an enhanced visual indication of the sampled electrical signal contents.

10 Claims, 5 Drawing Figures

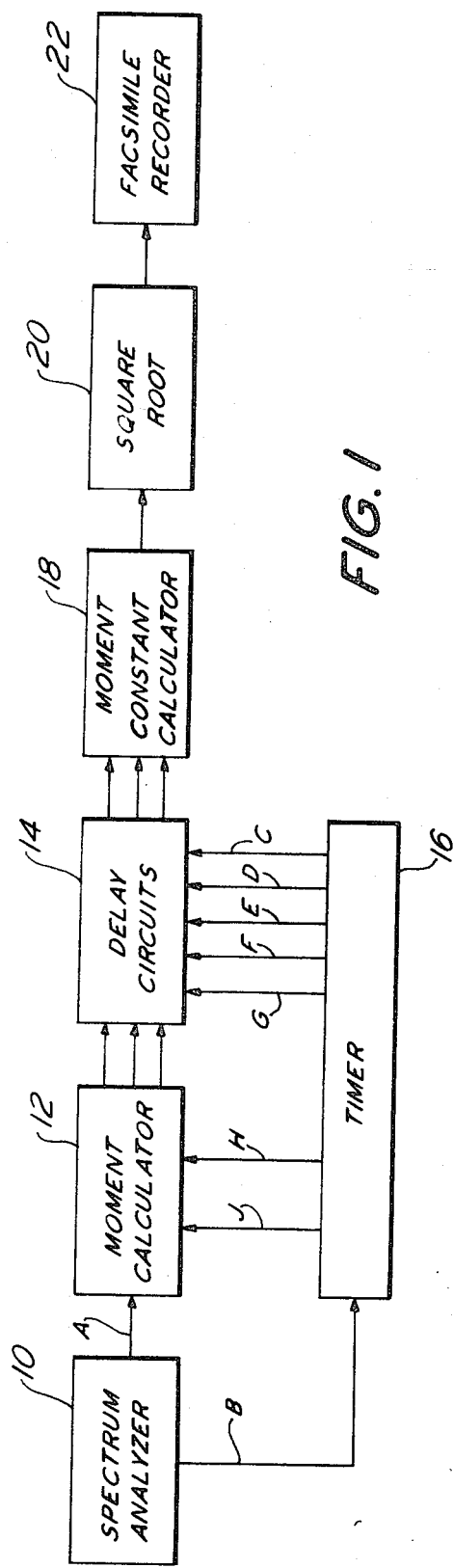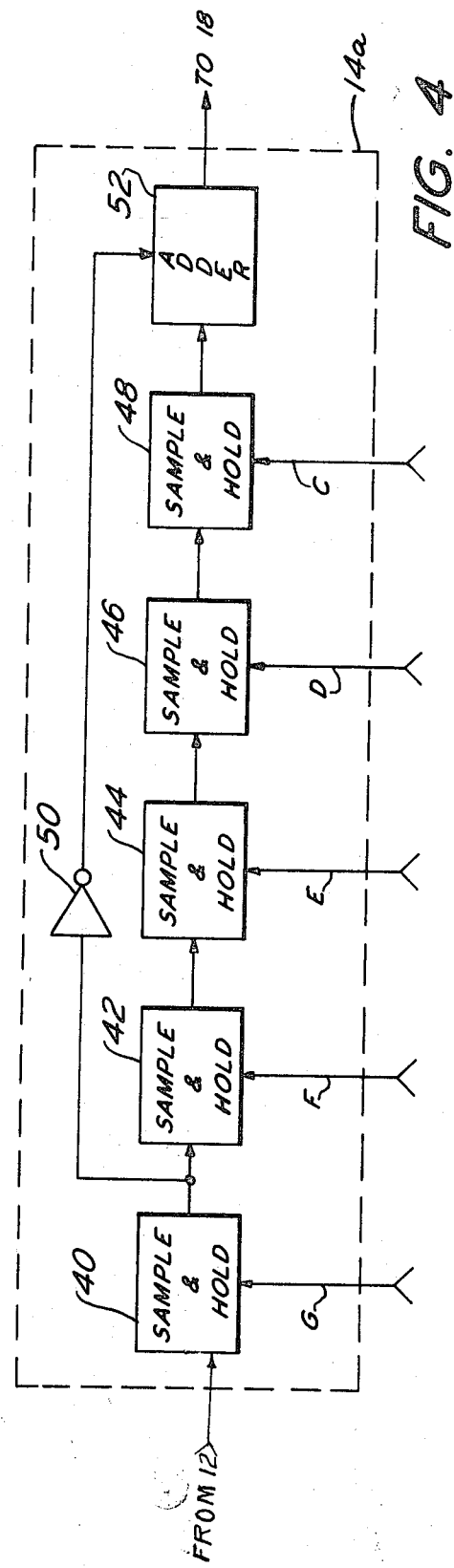

STATISTICAL NOISE PROCESSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to signal processors and particularly to a statistical signal processor wherein the signal to noise ratio is substantially improved over prior art devices.

In receiving electrical signals indicative of the sounds produced within an ocean environment, it is especially desirable that particular signals of interest such as transients or target signals be easily distinguished from signals generated by the ocean noise. Prior art processors have used automatic gain control (AGC), the difference of variances, or threshold limiting to obtain amplitude information representative of signals within a noise environment. Signals were processed to increase the signal amplitude peaks over the noise peaks. Such processors become ineffective at the signal level wherein the signal peak amplitude becomes equal to the noise peak amplitude.

SUMMARY OF THE INVENTION

Accordingly, it is an object of the present invention to provide a statistical noise processor which will improve the signal to noise ratio of received electrical signals generated within an ocean environment. Other objects of the present invention are reduction in relative size and weight due to the selection of fewer components and the use of microelectronic circuitry.

Briefly, these and other objects are accomplished by a statistical noise processor which manipulates the differences of the mean, variance and third moments of an input signal to calculate an effective amplitude value indicative of a target or transient signal within a noise environment. A spectrum analyzer supplies an output signal indicative of underwater sound samples. A moment calculator is timed to calculate the mean, variance and third moment of the spectrum analyzer output signal samples. A delay circuit delays the calculated moment values for comparison with later produced analyzer output signal samples and provides signals to a moment constant calculator that obtains the difference between a first higher order moment signal and the square of a second higher order moment signal to provide an output signal having an effective amplitude indicative of a target or transient within the noise environment. The output signal is displayed on a lofargram which illustrates and enhances signals within the noise background.

For a better understanding of these and other aspects of the invention, reference may be made to the following detailed description taken in conjunction with the accompanying drawings.

BRIEF DESCRIPTION OF THE DRAWINGS

FIG. 1 is a functional block diagram of a signal analyzer and a statistical noise processor as used within the present invention;

FIG. 4 is a schematic diagram of a portion of the delay circuits shown in FIG. 1.

DESCRIPTION OF THE PREFERRED EMBODIMENT

Figure 2:
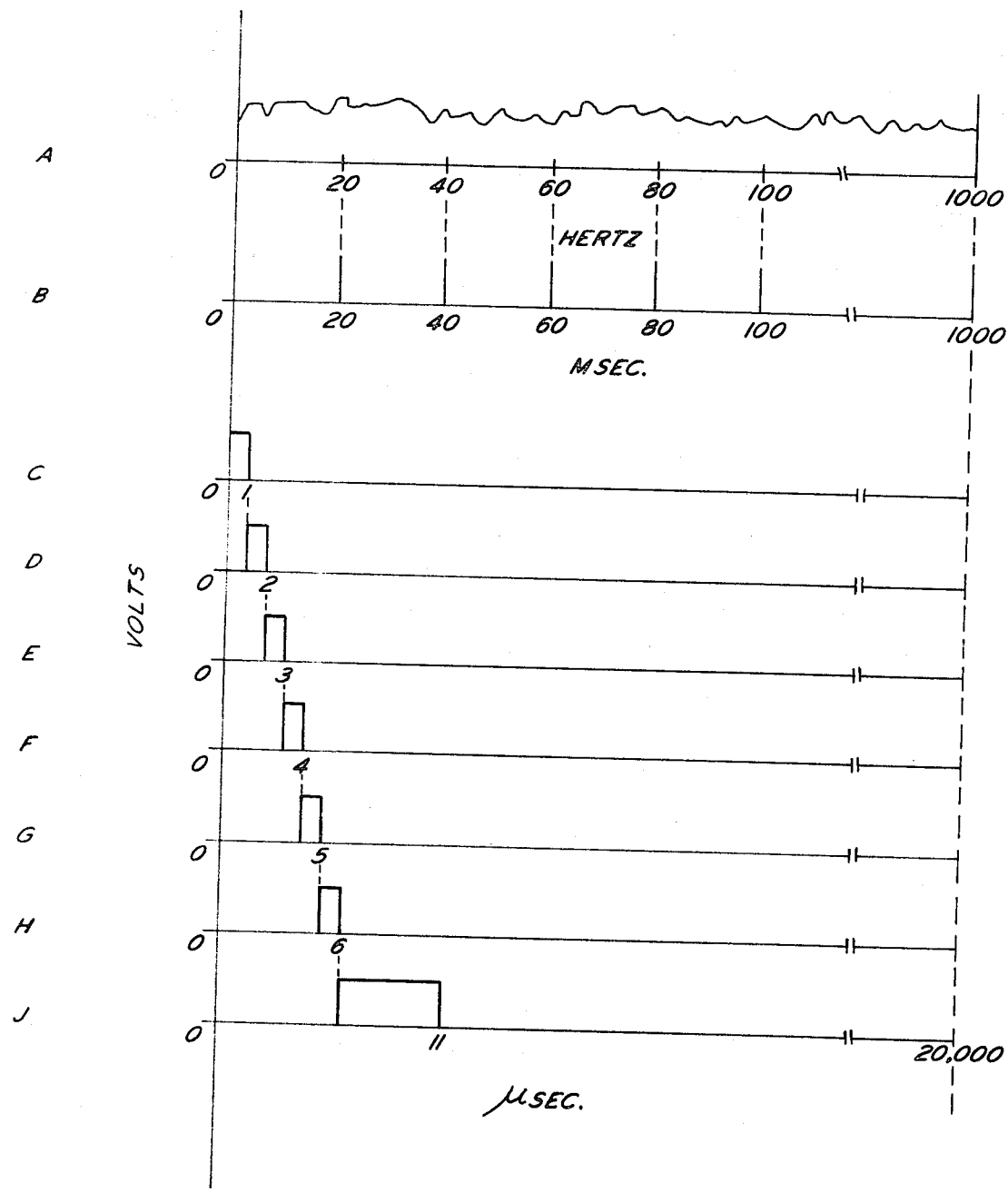
FIG. 2 illustrates typical waveform signals provided by the invention shown in FIG. 1.

A major problem in antisubmarine warfare is the detection of signals within a high noise level environment such as found in an ocean. The present invention describes apparatus for increasing the capability to recognize signals that are embedded in background ocean noise. It is known that particular statistical properties of an electrical signal generated by sonic perturbations will vary in both frequency and in time. The particular statistical properties are the mean, variance, and other higher moments of the electrical signal. The statistical processor of the present invention utilizes the differences between calculated moments of successive sets of sound generated data to retrieve signal information. The moment differences are combined to produce an output signal which contains an effective amplitude, the magnitude of which is proportional to the differences.

The statistically calculated effective amplitude is found by assuming that an input signal is a transient, and that the transient alters the ocean noise statistically from each statistical set of data. As successive statistical sets of data are entered into the present invention, the resulting newly calculated moments are compared against previous calculated moments. The comparison yields changes which are attributed to the presence of the transient or target signal. These changes of moments are used to compute the effective amplitude of the transient signal.

The changes of moments are due to one or more significant statistical changes within the data set. It does not matter where these significant changes have occurred within the data set. Conventional statistical analyzers greatly reduce the magnitude of a calculated effective amplitude value due to averaging processors within the analyzer. However, the effective amplitude value can be recovered by computations and manipulations of the differences of the means, variances, and third moments of the input signal. The statistical processor of the present invention performs the following functions:

1. Computes the means, variances, and third moments from the noise data;
2. Compares the new moments with the older moments;
3. Establishes the proper relationships between the comparisons of the moment differences; and
4. Calculates the effective amplitude.

The mathematical design equations which are implemented within the structure of the present invention directly relate the variations in the ocean noise data. These variations are a function of the differences of some of the higher order moments. From the calculation of the differences between the moments the computation of an effective amplitude $A_e$ is made. The expression for this effective amplitude $A_e$ is given by the following equation:

$$A_e = \sqrt{12(M_3 - M_2{}^2)}$$

wherein $M_3$ and $M_2{}^2$ are moment constants that relate to the difference of the higher order moments. These moment constants are calculated according to the following equations:

$$M_3 = \Delta\mu_3/3\Delta\mu + (\Delta\mu)^2/3$$

$$M_2{}^2 = \tfrac{1}{4}(\Delta\sigma^2/\Delta\mu - \Delta\mu)^2$$

wherein:

$\Delta\mu_3$ is the difference of the third moments measured at different frequencies and averaged over the same frequency band;

$\Delta\sigma^2$ is the differences of the variances measured at different frequencies and averaged over the same frequency band;

$\Delta\mu$ are the differences of the means measured at different frequencies and averaged over the same frequency band; and $\sigma_1{}^2$ is the variance measured during the first frequency band.

Frequency bands are easily generated by a spectrum analyzer which provides successive signal samples over a recurring bandwidth. The effective amplitude $A_e$ in this analysis is the value or magnitude in the data that causes the sample statistic to be different. Accordingly, the effective amplitude has the functional form:

$$A_e = k\sqrt{M_3 - M_2{}^2}$$

wherein $k$ is a constant equal to the square root of 12 as shown in the first illustrated equation. Thus, the structure of the present invention electronically implements the term $\sqrt{M_3 - M_2{}^2}$.

The moment equation for the mean $\mu$ of an input signal is:

$$\mu = \frac{1}{N}\sum_{i=1}^{N} X_i$$

wherein $i = 1, 2, \ldots N$, and $N$ is the number of data samples $X$. The equation for the variance $\rho^2$ is:

$$\sigma^2 = \frac{1}{N}\sum_{i=1}^{N}(X_i - \mu)^2$$

The equation for the third moment $\mu_3$ of an input signal is:

$$\mu_3 = \frac{1}{N}\sum_{i=1}^{N}(X_i - \mu)^3$$

As well known in statistical theory, moments can be computed either by the summation of discrete values or by integrals. Since integrals are easier to implement by electrical circuits, the present invention uses integrals in the computation of moment values.

It will be apparent that the number $N$ of data samples $X$ in the discreet averaging process corresponds to the length of time of the integration. Thus the equation for the means becomes:

$$\mu = \frac{1}{t_2 - t_1}\int_{t_1}^{t_2} f(t)dt$$

wherein $f(t)$ is the ambient noise data measured in time, and $t_2$ and $t_1$ are the limits of the integration time measured in seconds. The data is shifted in order to be summed about a zero mean during the computation of higher moments. This shifting does not alter the value of the variance and third moment but it does simplify the computation process. Thus the moment equation for the variance becomes:

$$\sigma^2 = \frac{1}{t_2 - t_1}\int_{t_1}^{t_2} f^2(t)dt$$

and the moment equation for the third moment becomes:

$$\mu_3 = \frac{1}{t_2 - t_1}\int_{t_1}^{t_2} f^3(t)dt$$

Referring now to FIG. 1 there is shown a conventional spectrum analyzer, such as an AQA–5, which is adapted to receive an input signal indicative of underwater sounds. The sonar information, for example, may be relayed by an underwater transducer (not shown) which transmits in formation to the spectrum analyzer 10. In the present embodiment, the spectrum analyzer 10 provides output signal samples representative of sonar information which spans a frequency spectrum from 0–1,000 Hz. shown in FIG. 2A. As may also be seen in waveform A, the output varies in amplitude as well as frequency. The frequency spectrum is arbitrarily divided into 500 frequency bands each having a spread of 20 Hz. It is within these frequency bands of 20 Hz. that the processor integration time takes place. The moments are therefore evaluated over a 20 Hz. band. That is, the calculations start at 0 Hz. and continue up to 1,000 Hz. in increments of 20 Hz. bands. After the completion of the 1,000 Hz. calculation, the process starts over again at 0 Hz. The comparisons of the differences of the calculated moments will be arbitrarily separated by 80 Hz. It has been found that such a separation provides the most effective results.

Referring again to FIG. 1 in conjunction with FIG. 2, a moment calculator 12 receives a sampled 20 Hz. bandwidth output signal from the spectrum analyzer 10 and provides three output signals indicative of the mean, variance and third moment of the analyzer output signal to delay circuits 14. A second output signal shown in waveform FIG. 2B from the analyzer 10 provides timing signals to the input of a timer 16 which provides five output signals noted as waveforms C–G to timing inputs of delay circuit 14 and two other output timing signals noted as waveforms H and J to timing inputs of moment calculator 12. A moment constant calculator 18 receives three outputs from the delay circuits 14 representative of the mean difference $\Delta\mu$ signal, the variance difference $\Delta\sigma^2$ signal, and the third moment difference $\Delta\mu_3$ signal and provides an output signal representative of the value $M_3 - M_2{}^2$ to a square root circuit 20. The square root circuit 20 provides an output to a facsimile recorder 22 which produces a lofargram output.

The operation of the device will now be explained with reference to FIGS. 2–5. FIG. 2A describes a typical output signal from the spectrum analyzer 10. One full sweep of the spectrum analyzer occupies 1,000 Hz. during which time the output signal varies in amplitude as well as frequency. Waveform B illustrates an output timing signal produced by the analyzer 10 which provides a series of pulses each spaced 20 Hz. The operation of the analyzer is programmed so that the entire frequency sweep of 1,000 Hz. requires one second. Accordingly, each of the pulses shown in waveform B occurs at 20 millisecond intervals and indicates the sampling of a new 20 Hz. frequency band by the analyzer 10.

Figure 3:
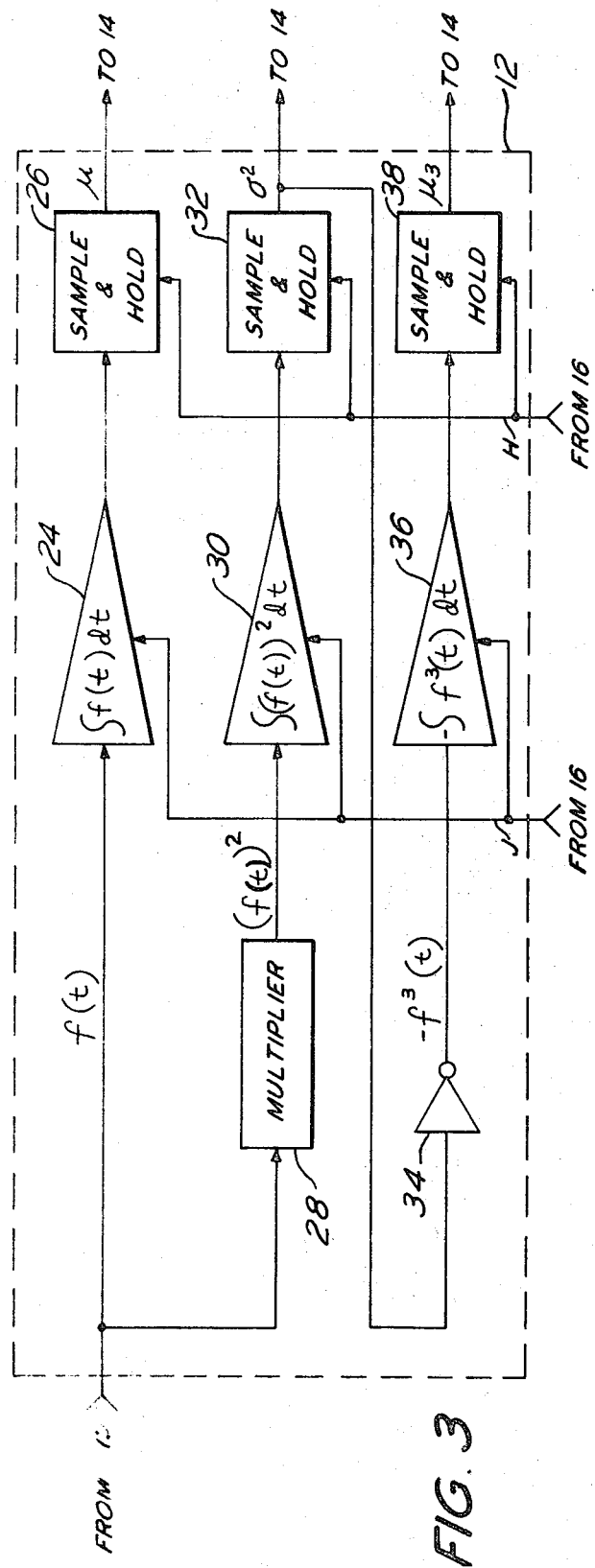
FIG. 3 is a schematic diagram of the moment calculator illustrated in FIG. 1.

Referring now to FIG. 3, there is shown a schematic diagram of the calculator 12. A conventional integrator 24 is connected to receive the output signal shown in waveform A from the analyzer 10. The contents of any one frequency band of this output signal, for purposes of better explanation, will be referred to as $f(t)$. the integrator 24 integrates $f(t)$ and provides an output signal to a sample and hold circuit 26. The conventional sample and hold circuit 26 contains a capacitor which stores the last calculated maximum value of the integrated output signal. The stored value at the end of the 20 millisecond integration period is provided at the output Hz., the sample and hold circuit 26 mean and represents a mean value $\mu$ of $f(t)$. A multiplier 28 has an input connected to receive the output signal from the analyzer 10 and multiplies the value of this signal by itself to effectively provide a squaring device. The output $(f(t))^2$ of the multiplier 28 is provided to the input of an integrator 30 which integrates the input signal and provides an output signal to a sample and hold circuit 32. The value stored within the sample and hold circuit 32 represents the variance $\sigma^2$ of the input signal $f(t)$ and is provided at an output of the circuit 32. An inverter 34 is connected to the output of the sample and hold circuit 32 and receives the variance value $\sigma^2$ which is mathematically identical to $f^2(t)$. The output $-f^2(t)$ of the inverter 34 is received by the input of an integrator 36 which integrates this signal value. Conventional inverters such as used within the present invention may be easily constructed from operational amplifiers having a gain of $-1$. Such an inverter will therefore invert the polarity of the input signal. The output of integrator 36 is connected to the input of a sample and hold circuit 38 whose stored value is indicative of a third moment $\mu_3$ of the input signal $f(t)$. Thus, the moment calculator 12 has provided three distinct outputs representative of the mean $\mu$, the variance $\sigma^2$ and the third moment $\mu_3$, respectively, of the output signal $f(t)$ from the spectrum analyzer 10 shown in waveform A.

Referring now to FIG. 4, there is shown a schematic diagram of one portion of the delay circuit 14. Delay circuit 14 contains three separate and identical delay circuits, only one of which is shown in FIG. 4. The three separate delay circuits process the mean, variance and third moment signals, respectively. A group of five sample and hold circuits 40, 42, 44, 46 and 48 are all serially connected to one another such that the input of a proceeding sample and hold circuit is provided by the output of the preceding sample and hold circuit. The first sample and hold circuit 40 within the group receives an input signal from an output of the delay circuit 14. The particular output signal from the delay circuit 14 may represent, for example, the mean $\mu$. The output of the sample and hold circuit 40 is commonly connected to the input of sample and hold circuit 42 and the input of an inverter 50 whose output is connected to one input of an adder 52. A second input of the adder 52 is connected to receive the output from the last sample and hold circuit 48 in the group. Each of the sample and hold circuits 40–48 have a timing input to receive respective timing signals from the timer 16.

Referring now to FIG. 2 in conjunction with FIGS. 3 and 4, the operational timing of the invention will now be explained. Timer 16 receives an input signal as shown in waveform B of FIG. 2. The pulses of waveform B occur every 20 milliseconds and are of a duration of approximately one microsecond. Waveforms C–J represent a magnified portion of one 20 millisecond period within the full one second sweep of the analyzer 10 output. Assuming that the invention has been turned on for some minimal amount of time and that all circuitry has settled to its normal operating state, a one microsecond pulse as shown in waveform C begins at zero time corresponding with the inception of the first 20 Hz. frequency band. Each of the succeeding pulses shown in waveforms D, E, F, G and H occupy approximately one microsecond and are delayed in time one microsecond from the preceding pulse. The timing pulse shown in waveform J is five microseconds long and is initiated at the end of the pulse shown in waveform H. All of the pulses C–J are provided by the conventional timer 16 which may, for example, be constructed from a seven stage ripple counter in which the delay and individual pulse durations may be separately controlled by individual delay multivibrators. Referring now to FIG. 4, sample and hold circuit 48 receives the first timing pulse C and samples the output value which was held in the preceding sample and hold circuit 46. Concurrently, the new value which is now stored in sample and hold circuit 48 is provided to one input of the adder 52. Similarly, sample and hold circuits 46, 44 and 42 each successively store new values of data upon receipt of timing signals D, E and F, respectively. Upon receipt of timing signal G, sample and hold circuit 40 stores the value of the mean $\mu$ held in the sample and hold circuit 26 of the moment calculator 12. Timer 16 now provides timing signal H to each of the sample and hold circuits 26, 32 and 38 of the moment calculator 12. Upon receipt of timing signal H the sample and hold circuits 26, 32 and 38 store the last calculated value from integrators 34, 30 and 36, respectively. Immediately proceeding timing signal H, the timer 16 provides timing signal J to each of the integrators 24, 30 and 36 in moment calculator 12. Upon receipt of timing signal J, integrators 24, 30 and 36 are reset. The resetting could be most effectively done, for example, by shorting the integration capacitor within the individual integrators. At the end of timing pulse J the integrators 24, 30 and 36 are again permitted to integrate input values with a new frequency band and thus repeat the moment calculation and delay process. An inverter 50 has an input connected to receive the output from sample and hold circuit 40. The output of inverter 50 is connected to a second input of the adder 52. If, for example, the operation of the invention is started at the beginning of the frequency sweep of the analyzer 10, sample and hold circuit 48 would have stored in it the mean value of the input signal from 0–20 Hz. Similarly, sample and hold circuits 46, 44, 42, and 40 would each have stored the mean values from 21–40 Hz., 41–60 Hz., 61–80 Hz., and 81–100 Hz. The adder 52, therefore, receives on its first input the mean value of the input signal ranging from 0–20 Hz. and on the second input the inverted, i.e., negative, mean value of the signal ranging from 81–100 Hz. Thus the adder 52 calculates the difference in the mean $\mu$ of two integrated values having an 80 Hz. separation and provides this difference value $\Delta\mu$ at an output. Similarly, the outputs of the two remaining sections of the delay circuit 14 each provide the differences of the variances $\Delta\sigma^2$ and the third moments $\Delta\mu_3$, respectively.

Figure 5:
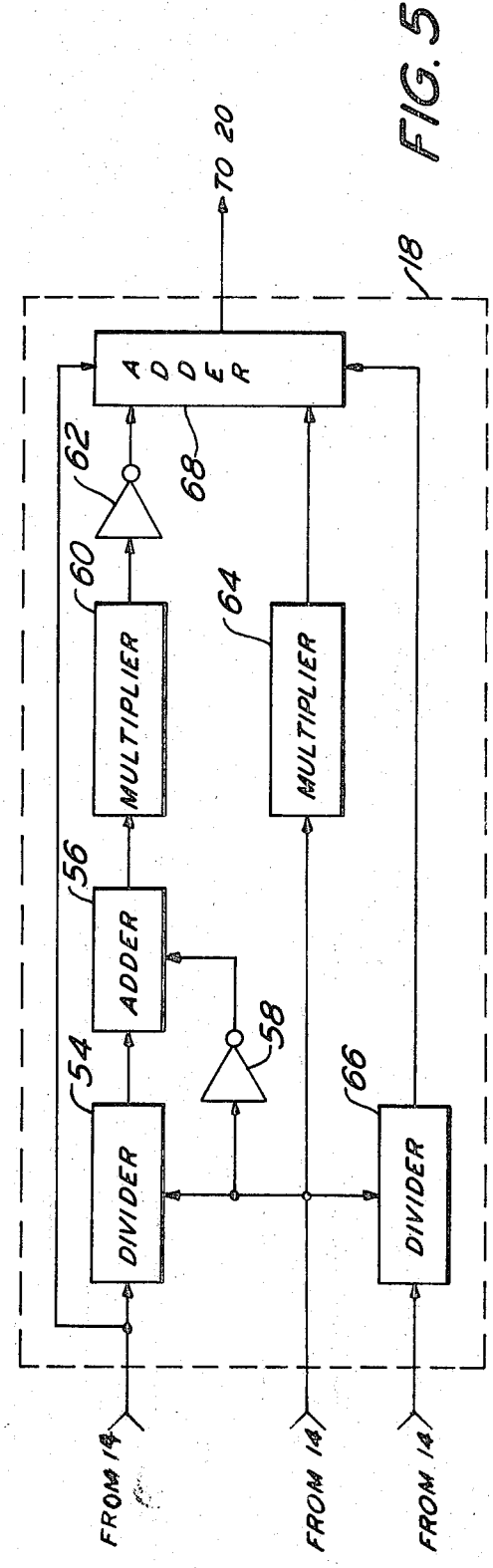
FIG. 5 is a schematic diagram of the moment constant calculator shown in FIG. 1

Referring now to FIG. 5 there is shown a schematic diagram of the moment constant calculator 18. The purpose of the calculator 18 is to electronically implement the equations:

$$M_2{}^2 = \tfrac{1}{4}(\Delta\sigma^2/\Delta\mu - \Delta\mu)^2,$$

$$M_3 = \Delta\mu_3/3\Delta\mu + \sigma_1{}^2 + (\Delta\mu)^2/3,$$

and to calculate the difference between the two. Accordingly, there is provided a divider 54 having a first input connected to receive the calculated difference of the variance $\Delta\sigma^2$ from one output of the delay circuit 14. A second output from the delay circuit 14 representative of the difference of the means $\Delta\mu$ is commonly connected to a second input of the divider 54, an input of an inverter 58, an input of a multiplier 64, and a first input of a second divider 66. The divider 54 divides the first input by the second input and provides an output signal having a value representative of $\Delta\sigma^2/\Delta\mu$. The inverter 58 provides an output signal representative of the value $-\Delta\mu$ to a second input of adder 56. The output of adder 56 provides an output signal representative of the value $(\Delta\sigma^2/\Delta\mu - \Delta\mu)$ to an input of a multiplier 60. Multiplier 60 multiplies the input signal by itself and provides an output signal representative of the square of the input signal. The output signal from multiplier 60 is received by the input of an inverter 62 which inverts and scales the input signal to produce an output signal representative of the term $\tfrac{1}{4}(\Delta\sigma^2/\Delta\mu - \Delta\mu)^2$ which represents the quantity $(M_2)^2$ and forms a first input to an adder 68. The use of scalers in conjunction with integrators and operational amlifiers are well known in the art and are easily constructed by judicious selection of resistor values attached to the amplifier circuitry. Multiplier 64 multiplies the input signal $\Delta\mu$ by itself and provides an output signal which is scaled to represent the quantity $(\Delta\mu/3)^2$ which provides a second input to the adder 68. Divider 66 receives a second input from delay circuit 14 representative of the difference of the third moments $\Delta\mu_3$ and divides the second input by the first input signal. The quotient output of divider 66 forms the term $\Delta\mu_3/\Delta\mu$ which is provided to a third input of adder 68. A fourth input of adder 68 is connected to receive the $\Delta\sigma^2$ signal from the output of the delay circuit 14. It should be noted that the use of $\Delta\sigma^2$ in the final calculation of the moment constant calculator 18 is not absolutely mathematically correct. However, the electronic implementation of the term $\Delta\sigma^2$ has been found to provide an effective calculation parameter which is sufficiently close to the mathematically correct value of $\sigma_1{}^2$ and thus minimizes the complexity of the invention. The adder 68 adds all four inputs to provide an output signal which is representative of the difference $(M_3 - M_2{}^2)$. The output signal from the adder 68 within the calculator 18 forms an input to a conventional square root circuit 20 which calculates a square root value output signal having an effective amplitude $A_e$ which is proportional to the sonic disturbances found within the noise environment of the ocean. A facsimile recorder 22 receives the output signal from the square root circuit 20 and produces a lofargram which visually illustrates the sonic disturbances within the ocean body.

Thus it may be seen that there has been provided a statistical processing device for enhancing the readability of signals and transients within a noise environment by calculations utilizing the mean $\mu$, variance $\sigma^2$ and third moment $\mu_3$ of an input signal to provide an output signal having an effective amplitude $A_e$ which is proportional to the degree of disturbances generated within a noise environment.

Obviously, many modifications and variations of the invention are possible in light of the above teachings. For example, the invention may be used with any noise generated signal having transients therein. It is therefore to be understood that within the scope of the appended claims the invention may be practiced otherwise than as specifically described.

What is claimed is:

1. Statistical signal processing apparatus for enhancing the readability of repetitive spectrum analysis samples of a noise signal comprising in combination:

timing means having an input for receiving a signal at the beginning of each sample and for providing at least four sequentially timed pulses;

first calculating means for receiving each sample and connected to receive the ultimate and penultimate of said pulses, respectively, and for calculating the mean, the variance and the third moment of each sample in response to said ultimate and penultimate pulses and for producing signals representative thereof;

delay means connected to receive said first calculating means signals and the remaining of said pulses for providing first, second and third delayed signals indicative of the difference between the means, the variances and third moments, respectively, of sequential ones of the samples;

second calculating means connected to receive said delay means signals for calculating the square root of the difference between a first higher order moment and the square of a second higher order moment of the sample and for producing a signal having an amplitude representative of the enhanced spectrum analysis samples.

2. Signal processing apparatus according to claim 1 wherein said first calculating means further comprises:

first processing means connected to receive each sample and the ultimate and penultimate pulses for integrating and storing said sample in response to said ultimate and penultimate pulses to produce an output signal indicative of the mean thereof;

second processing means having an input connected to receive each sample and the ultimate and penultimate pulses for integrating and storing said sample in response to said ultimate and penultimate pulses to produce an output signal indicative of the variance thereof; and third processing means having an input connected to receive said second processing means output signal and the ultimate and penultimate pulses for integrating and storing said second processing means output signal in response to said ultimate and penultimate pulses to produce an output signal indicative of the third moment thereof.

3. Signal processing apparatus according to claim 2 wherein said first processing means further comprises;

a first integrator connected to receive each sample and the ultimate pulse for integrating the sample in response to said ultimate pulse and to produce a signal representative thereof; and first storage means connected to receive said first integrator signal and the penultimate pulse for storing the value of said integrator signal at the end of each sample in response to said penultimate pulse and to produce said first processing means output signal.

4. Signal processing apparatus according to claim 3 wherein said second processing means further comprises:

a first multiplier connected to receive each sample for producing a signal representative of the squared value of each sample;

a second integrator connected to receive said first multiplier signal and the ultimate pulse for integrating said multiplier signal in response to said ultimate pulse and to produce a signal representative thereof; and second storage means connected to receive said second integrator signal and the penultimate pulse for storing the value of said second integrator signal at the end of each sample in response to said penultimate pulse and to produce said second processing means output signal.

5. Signal processing apparatus according to claim 4 wherein said third processing means further comprises:

a third integrator operatively connected to receive said second processing means output signal and connected to receive the ultimate pulse for integrating said second processing means output signal in response to said ultimate pulse and to produce a signal representative thereof; and third storage means connected to receive said third integrator signal and the penultimate pulse for storing the value of said third integrator signal at the end of each sample in response to said penultimate pulse and to produce said third processing means output signal.

6. Signal processing apparatus according to claim 5 wherein said delay means further comprises:

first difference means connected to receive said first processing means output signal for producing the mean difference between said sequential ones of the samples and providing a first output signal representative thereof;

second difference means connected to receive said second processing means output signal for producing the variance difference between said sequential ones of the samples and providing a second output signal representative thereof; and third difference means having an input connected to receive said third processing means output signal for producing the third moment difference between said sequential ones of the samples and providing a third output signal representative thereof.

7. Signal processing apparatus according to claim 6 wherein said first, second and third difference means each further comprises:

holding means connected to receive individual ones of said first calculating means signals and the remainder of said timing means pulses for sequentially storing a plurality of said ones of said first calculating means signals in response to said remaining pulses and for providing a first signal representative of a first stored signal and a second signal representative of a later stored signal;

inverting means connected to receive said holding means second signal for inverting the polarity of said second signal and producing a signal representative thereof; and adding means connected to receive said holding means first signal and said inverting means signal for producing the delayed differential signals of said delay means.

8. Signal processing means according to claim 7 wherein said holding means includes a plurality of serially connected sample and hold circuits.

9. Signal processing means according to claim 8 wherein said second calculating means further comprises:

a first divider having a first input connected to receive said delay means first signal and a second input connected to receive said delay means second signal for dividing said second input by said first input and producing a quotient thereof;

a first inverter connected to receive said delay means first signal for inverting the polarity of said delay means first signal and for producing a signal representative thereof;

a first summer having a first input connected to receive said quotient and a second input connected to receive said first inverter signal for producing a signal representative of the sum thereof;

a second multiplier connected to receive said first summer signal for producing a signal representative of the squared value thereof;

a second inverter connected to receive said second multiplier signal for inverting the polarity of said second multiplier signal and for producing a signal representative thereof;

a third multiplier connected to receive said delay means first signal for producing a signal representative of the squared value thereof;

a second divider having a first input connected to receive said delay means first signal and a second input connected to receive said delay means third signal for dividing said second input by said first input and producing a quotient thereof;

a second summer having a first input connected to receive said delay means second signal, a second input connected to receive said second inverter signal, a third input connected to receive said third multiplier signal and a fourth input connected to receive said second divider quotient for producing a signal representative of the sum thereof; and root means connected to receive said second summer signal for producing a signal representative of the square root thereof.

10. Signal processing apparatus according to claim 1 further comprising in combination:

recording means for receiving said second calculating means signal for producing a lofargram replica thereof.

* * * * *